US008530393B2

(12) United States Patent
Kulkarni et al.

(10) Patent No.: US 8,530,393 B2
(45) Date of Patent: Sep. 10, 2013

(54) METHODS TO CHARACTERIZE FRACTURE PLUGGING EFFICIENCY FOR DRILLING FLUIDS

(75) Inventors: Sandeep D. Kulkarni, Pune (IN); Sharath Savari, Pune (IN); Arunesh Kumar, Pune (IN); Matthew L. Miller, Houston, TX (US); Robert Murphy, Kingwood, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/150,942

(22) Filed: Jun. 1, 2011

(65) Prior Publication Data

US 2012/0264658 A1 Oct. 18, 2012

(51) Int. Cl.

| | |
|---|---|
| ***E21B 21/00*** | (2006.01) |
| ***E21B 43/22*** | (2006.01) |
| ***E21B 43/26*** | (2006.01) |
| ***E21B 33/00*** | (2006.01) |
| ***E21B 33/13*** | (2006.01) |
| ***C09K 8/32*** | (2006.01) |

(52) U.S. Cl.
USPC ........... 507/104; 507/138; 166/282; 166/283; 166/285; 166/292

(58) Field of Classification Search
USPC ................. 507/104, 138; 166/282, 283, 285, 166/292
See application file for complete search history.

(56) References Cited

U.S. PATENT DOCUMENTS

| | | | | |
|---|---|---|---|---|
| 2,799,647 | A * | 7/1957 | Borcherdt | 507/104 |
| 4,561,985 | A | 12/1985 | Glass, Jr. | |
| 5,284,207 | A | 2/1994 | Bittleston et al. | |
| 5,826,669 | A | 10/1998 | Zaleski et al. | |
| 5,905,061 | A | 5/1999 | Patel | |
| 5,977,031 | A | 11/1999 | Patel | |
| 6,085,844 | A | 7/2000 | Palmer et al. | |
| 6,164,380 | A | 12/2000 | Davis | |
| 6,290,001 | B1 | 9/2001 | West et al. | |
| 6,584,833 | B1 | 7/2003 | Jamison et al. | |
| 6,630,429 | B1 | 10/2003 | Cremeans et al. | |
| 6,828,279 | B2 | 12/2004 | Patel et al. | |

(Continued)

FOREIGN PATENT DOCUMENTS

| | | |
|---|---|---|
| WO | WO 2009/106796 | 9/2009 |
| WO | WO 2010/133302 A1 | 11/2010 |
| WO | WO 2010/142370 A1 | 12/2010 |

OTHER PUBLICATIONS

Van Vliet et al., Development and Field Use of Fibre-Containing Cement; Offshore Technology Conference, Houston, Texas, 1995, OTC 7889.

(Continued)

*Primary Examiner* — Ling-siu Choi
*Assistant Examiner* — Aiqun Li
(74) *Attorney, Agent, or Firm* — Craig W. Roddy; McDermott Will & Emery LLP

(57) ABSTRACT

Of the many compositions and methods provided herein, one method includes providing a drilling fluid comprising a base drilling fluid and a plurality of particulates, wherein the base drilling fluid without the particulates is characterized by $N_{1(B)}$ and wherein the base drilling fluid with the particulates is characterized by $N_{1(A)}$; and adjusting a concentration of the particulates in the drilling fluid by comparing the value of $\Delta N_{1(F)}$ to $\Delta N_{1(P)}$ so that $\Delta N_{1(F)} \geqq \Delta N_{1(P)}$, wherein $\Delta N_{1(F)} = |N_{1(A)}| - |N_{1(B)}|$.

8 Claims, 6 Drawing Sheets

(56) References Cited

U.S. PATENT DOCUMENTS

| | | | | |
|---|---|---|---|---|
| 7,066,285 | B2 | 6/2006 | Shaarpour | |
| 7,264,053 | B2 | 9/2007 | Vargo, Jr. et al. | |
| 7,331,391 | B2 | 2/2008 | Keese et al. | |
| 7,456,135 | B2 | 11/2008 | Kirsner et al. | |
| 7,462,580 | B2 | 12/2008 | Kirsner et al. | |
| 7,488,704 | B2 | 2/2009 | Kirsner et al. | |
| 7,534,743 | B2 | 5/2009 | Kirsner et al. | |
| 7,547,663 | B2 | 6/2009 | Kirsner et al. | |
| 2005/0170973 | A1 * | 8/2005 | Verret | 507/107 |
| 2006/0178275 | A1 | 8/2006 | Shaarpour | |
| 2006/0237192 | A1 | 10/2006 | Shaarpour | |
| 2007/0169937 | A1 | 7/2007 | Allin et al. | |
| 2009/0008095 | A1 | 1/2009 | Duncum et al. | |
| 2009/0255668 | A1 | 10/2009 | Fleming et al. | |
| 2010/0018294 | A1 | 1/2010 | Tonmukayakul et al. | |
| 2010/0137168 | A1 | 6/2010 | Quintero et al. | |
| 2010/0139387 | A1 | 6/2010 | Jamison et al. | |
| 2010/0152070 | A1 | 6/2010 | Ghassemzadeh | |

OTHER PUBLICATIONS

Messier et al., Controlling Cement Tops Through Use of Fibre-Based Slurries Reduces Drilling Costs; JCPT Paper 2002-085TN, vol. 42, No. 5, May 2003.

Ravi et al., Cementing Technology for Low Fracture Gradient and Controlling Loss Circulation; SPE/IADC Indian Drilling Technology Conference and Exhibition, Mumbai, India, Oct. 2006, SPE/IADC 102074.

Aadnoy et al., Design of Well Barriers to Combat Circulation Losses; SPE/IADC Drilling Conference, Amsterdam, The Netherlands, Feb. 2007, SPE/IADC 105449.

Kumar et al., Wellbore Strengthening: The Less-Studied Properties of Lost-Circulation Materials; Society of Petroleum Engineers Annual Technical Conference and Exhibition, Florence, Italy, Sep. 2010, SPE 133484.

Kefi et al., Optimizing in Four Steps Composite Lost-Circulation Pills Without Knowing Loss Zone Width; IADC/SPE Asia Pacific Drilling Technology Conference and Exhibition, Ho Chi Minh City, Vietnam, Nov. 2010, IADC/SPE 133735.

Abe et al., Advances in Polymer Science, vol. 157, 2001.

Savari et al., "Improved Lost Circulation Treatment Design and Testing Techniques Minimize Formation Damage," Society of Petroleum Engineers, SPE European Formation Damage Conference held in Noordwijk, The Netherlands, Jun. 7-10, 2011, SPE 143603.

Halliburton Brochure; "Hydro-Guard@ Inhibitive Water-Based Fluid," A High Performance Solution for Reactive Formations and Environmentally Sensitive Locations, 2006.

Halliburton Brochure; "INNOVERT® High Performance Paraffin/Mineral Oil-Based Fluids from Baroid," Completing the Circle: Award-Winning ACCOLADE® Fluid Technology for Paraffin/Mineral Oil-Based Systems, 2008.

Whitfill et al., "New Design Models and Materials Provide Engineered Solutions to Lost Circulation," 2006 SPE Russian Oil and Gas Technical Conference and Exhibition held in Moscow, Russia, Oct. 3-6, 2006, SPE 101693.

Whitfill et al., "Preventing Lost Circulation Requires Planning Ahead," 2007 International Oil Conference and Exhibition in Mexico held in Veracruz, Mexico, Jun. 27-30, 2007, SPE 108647.

Whitfill, "Lost Circulation Material Selection, Particle Size Distribution and Fracture Modeling with Fracture Simulation Software," IADC/SPE Asia Pacific Drilling Technology Conference and Exhibition, 2008, IADC/SPE 115039.

James, David F., "Boger Fluids," XP-002679838, Annu. Rev. Fluid Mech. 2009, 41:129-142.

International Search Report and Written Opinion for PCT/US2012/038234 dated Aug. 1, 2012.

* cited by examiner

Cellulosic Fiber - 1

Cellulosic Fiber - 2

Carbon Fiber

Oil Coated Fiber

Aqueous Drilling Fluid With 0.5 ppb Carbon Fibers

Aqueous Drilling Fluid With 2.5 ppb Carbon Fibers

METHODS TO CHARACTERIZE FRACTURE PLUGGING EFFICIENCY FOR DRILLING FLUIDS

BACKGROUND

The present invention relates to methods for characterizing the plugging efficiency of drilling fluids and related compositions and methods of making and using such drilling fluids.

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit and providing a hydrostatic head to maintain the integrity of the wellbore walls, and prevent well blowouts. Specific drilling fluid systems, which can be oil-based or aqueous-based, are selected to optimize a drilling operation in accordance with the characteristics of a particular geological formation.

Treatment fluids often contain additives to adjust the characteristics of the fluid, i.e., wettability, viscosity; to provide for a specific treatment, i.e., lost circulation control or fracturing; in an effort to efficiently and effectively treat a subterranean formation. As used herein, the term “treatment,” or “treating,” refers to any subterranean operation that uses a fluid in conjunction with a desired function and/or for a desired purpose. The term “treatment,” or “treating,” does not imply any particular action by the fluid.

One of the issues facing drillers today is lost circulation. Lost circulation is loss of a drilling fluid into a subterranean formation through natural or induced voids. Lost circulation leads to significant loss in time and increase in costs due to the loss of whole drilling fluid, wasted rig time, and in the worst cases may lead to lost wellbores, side tracked or bypassed wells, abandoned wells, relief wells, and lost petroleum reserves. This is especially a problem in formations that have zones that have large voids.

Particulates, a common additive in drilling fluids, can help modulate the flow of fluids within, into, and out of the subterranean formation and/or the wellbore. More specifically, particulates may be used in drilling fluids to bridge fractures, provide fluid loss control, provide lost circulation control, seal surfaces for fluid diversion, plug voids, prop open fractures, and any combination thereof. The types and concentration of particulates added to a drilling fluid greatly impact the efficacy and efficiency of a given treatment. For example, the size and shape of the particulates can help determine whether the particulates allow or retard fluid flow. For example, proppants are designed to be substantially spherical so as to allow fluid flow around the particle as it holds open a void. Fibers have been of interest as particulate additives, but fibers may lead to problems like high viscosity and plugging downhole tools before reaching the formation.

Particulate concentration in a drilling fluid is estimated based on experiences with implementation in similar subterranean formations. As new particulates, e.g., lost circulation materials, and drilling fluids become available, a need exists to quickly determine an appropriate concentration of particulate to include in a treatment fluid to provide the appropriate level of fluid flow within, into, and out of a subterranean formation and/or wellbore.

SUMMARY OF THE INVENTION

The present invention relates to methods for characterizing the plugging efficiency of drilling fluids and related compositions and methods of making and using such drilling fluids.

One embodiment of the present invention is a method comprising: providing a drilling fluid comprising a base fluid and a plurality of particulates, wherein the base drilling fluid without the particulates is characterized by $N_{1(B)}$ and wherein the base drilling fluid with the particulates is characterized by $N_{1(A)}$; and adjusting a concentration of the particulates in the drilling fluid by comparing the value of $\Delta N_{1(F)}$ to $\Delta N_{1(P)}$ so that $\Delta N_{1(F)} \geqq \Delta N_{1(P)}$, wherein $\Delta N_{1(F)} = |N_{1(A)}| - |N_{1(B)}|$.

One embodiment of the present invention is a method comprising: providing a drilling fluid comprising a base drilling fluid and a plurality of particulates, wherein the base drilling fluid without the particulates is characterized by $N_{1(B)}$, wherein the base drilling fluid with the particulates is characterized by $N_{1(A)}$, and wherein a concentration of the particulates in the drilling fluid is adjusted to provide for $\Delta N_{1(F)} \geqq \Delta N_{1(P)}$, wherein $\Delta N_{1(F)} = |N_{1(A)}| - |N_{1(B)}|$, and introducing the drilling fluid into a wellbore penetrating a subterranean formation.

One embodiment of the present invention is a method for determining a Plug Normal Stress Difference ($\Delta N_{1(P)}$), the method comprising: providing a test base drilling fluid that is characterized by $N_{1(TB)}$; adding a first concentration of a test particulate to the test base drilling fluid; adjusting the concentration of the test particulate in the test base drilling fluid to achieve a minimum concentration of the test particulate in the test base drilling fluid that will substantially plug a tapered slot, wherein the test base drilling fluid with the minimum concentration of the test particulate is characterized by $N_{1(TA)}$; and calculating $\Delta N_{1(P)} = |N_{1(TA)}| - |N_{1(TB)}|$ wherein each First Normal Stress Difference is measured by the same procedure.

One embodiment of the present invention is a drilling fluid comprising: a base drilling fluid and a plurality of particulates, wherein a concentration of the particulates in the base drilling fluid provides for $\Delta N_{1(F)} \geqq \Delta N_{1(P)}$, wherein $\Delta N_{1(F)} = |N_{1(A)}| - |N_{1(B)}|$.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
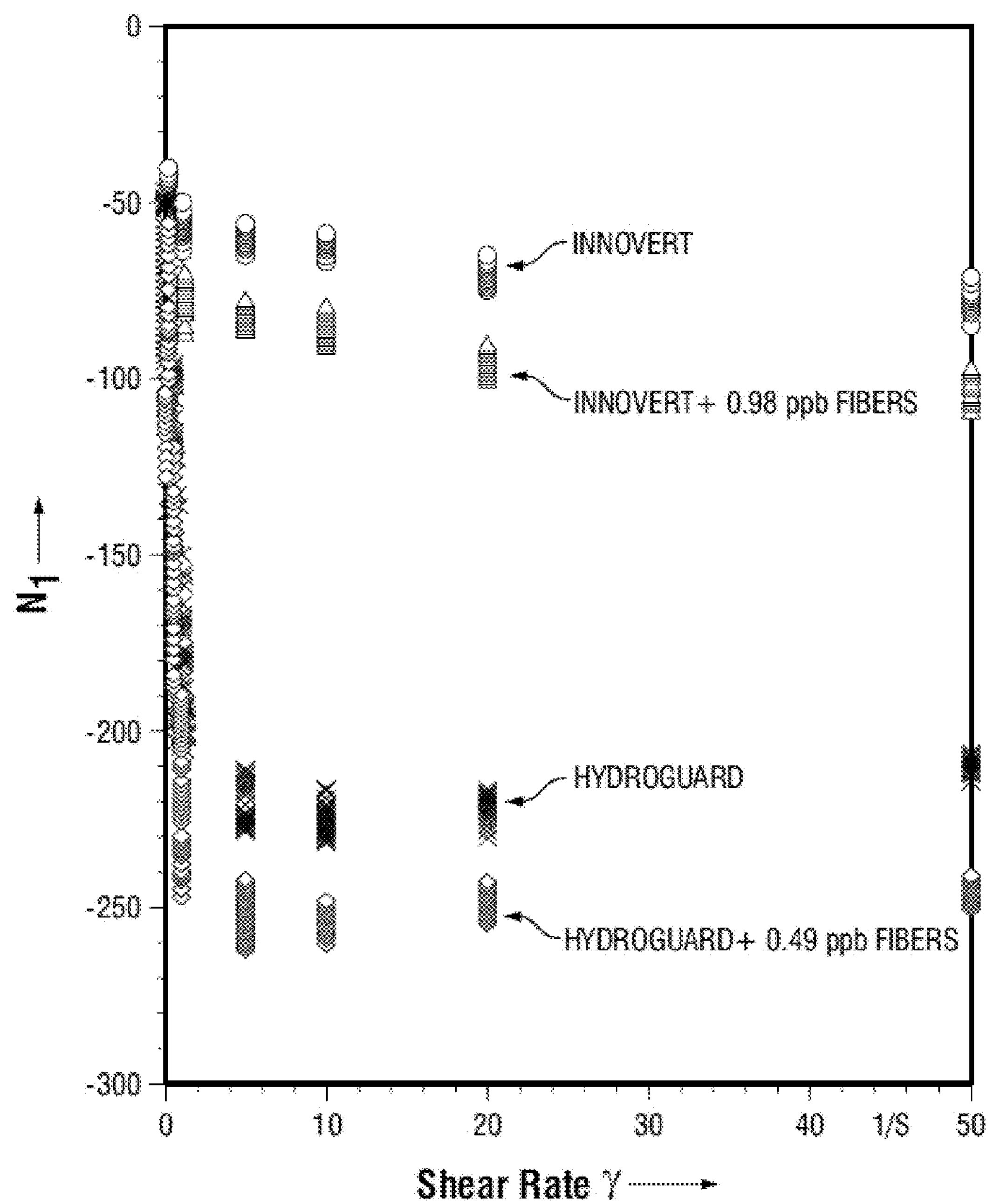
FIG. 1 is a comparison of First Normal Stress Difference for two drilling fluids with and without a fiber particulate of length 3000 microns.

The present invention relates to methods for characterizing the plugging efficiency of drilling fluids and related compositions and methods of making and using such drilling fluids.

Of the many advantages of the present invention, the present invention provides compositions of, methods of making, and methods of using drilling fluids with optimal concentrations of particulates determined through the rheological methods disclosed herein. The fluids provide a desired level of fluid flow into or out of a subterranean formation and/or wellbore. Fluid flow within, into, and out of a subterranean formation may be transmitted through voids in the subterranean formation and/or a wellbore. By way of nonlimiting example, voids may include pores, vugs, fissures, cracks, and fractures that may be natural or man-made. In some embodiments, controlling fluid flow may be achieved by methods including, but not limited to, bridging fractures, providing fluid loss control, providing lost circulation control, sealing surfaces for fluid diversion, and/or plugging voids. In preferred embodiments, the rheological methods of the present invention allow one to design fluids to have an optimal degree of fluid loss control and/or lost circulation control to prevent leak off of a treatment fluid into a portion of a subterranean formation neighboring a void. The rheological methods of the present invention provide a unique avenue to build a drilling fluid that will plug voids within a subterranean formation without directly testing the plugging of a matrix with a particular drilling fluid having a particulate concentration. Moreover, the methods provided herein allow for controlling the amount of particulates added to a drilling fluid to achieve a desired function, yet ensure particulate concentrations are not used is great excess, which for some particulates could mean significant cost savings. Additionally, with the ever growing library of particulates and drilling fluids, the present invention provides an avenue for easy implementation of an optimal drilling fluid needed for a given function that allows for optimal use of the fluids and particulates within the library.

In one embodiment of the present invention is a method comprising: providing a drilling fluid comprising a base fluid and a plurality of particulates, wherein the base drilling fluid without the particulates is characterized by $N_{1(B)}$ and wherein the base drilling fluid with the particulates is characterized by $N_{1(A)}$; and adjusting a concentration of the particulates in the drilling fluid by comparing the value of $\Delta N_{1(F)}$ to $\Delta N_{1(P)}$ so that $\Delta N_{1(F)} \geqq \Delta N_{1(P)}$, wherein $\Delta N_{1(F)}=|N_{1(A)}|-|N_{1(B)}|$.

In one embodiment of the present invention is a method comprising: providing a drilling fluid comprising a base drilling fluid and a plurality of particulates, wherein the base drilling fluid without the particulates is characterized by $N_{1(B)}$, wherein the base drilling fluid with the particulates is characterized by $N_{1(A)}$, and wherein a concentration of the particulates in the drilling fluid is adjusted to provide for $\Delta N_{1(F)} \geqq \Delta N_{1(P)}$, wherein $\Delta N_{1(F)}=|N_{1(A)}|-|N_{1(B)}|$, and introducing the drilling fluid into a wellbore penetrating a subterranean formation.

In one embodiment of the present invention is a method for determining a Plug Normal Stress Difference ($\Delta N_{1(P)}$), the method comprising: providing a test base drilling fluid that is characterized by $N_{1(TB)}$; adding a first concentration of a test particulate to the test base drilling fluid; adjusting the concentration of the test particulate in the test base drilling fluid to achieve a minimum concentration of the test particulate in the test base drilling fluid that will substantially plug a tapered slot, wherein the test base drilling fluid with the minimum concentration of the test particulate is characterized by $N_{1(TA)}$; and calculating $\Delta N_{1(P)}=|N_{1(TA)}|-|N_{1(TB)}|$ wherein each First Normal Stress Difference is measured by the same procedure.

In one embodiment of the present invention is a drilling fluid comprising: a base drilling fluid and a plurality of particulates, wherein a concentration of the particulates in the base drilling fluid provides for $\Delta N_{1(F)} \geqq \Delta N_{1(P)}$, wherein $\Delta N_{1(F)}=|N_{1(A)}|-|N_{1(B)}|$.

The concentration of particulates in a drilling fluid may be important to the efficacy and efficiency of fluid flow control, fluid loss control, and lost circulation control. Some embodiments of the present invention provide for methods of determining an optimal concentration or a concentration threshold of particulates in a drilling fluid to provide a desired level of fluid flow control, fluid loss control, and lost circulation control. In some embodiments, the rheological properties of a drilling fluid with and without particulates may be used to determine the level of fluid flow control, fluid loss control, and lost circulation control.

It should be understood that the term "particulate" or "particle," as used in this disclosure, includes all known shapes of materials, including substantially spherical materials, low to high aspect ratio materials, fibrous materials, polygonal materials (such as cubic materials), and mixtures thereof.

According to the methods of the present invention, the flow of a fluid in a void may be classified as a complex extensional flow where the extensional flow viscosity depends on the First Normal Stress Difference ($N_1$). Adding particulates to a drilling fluid may change the magnitude of $N_1$ as a function of concentration of the particulates. As used herein, the magnitude of $N_1$ is the absolute value of $N_1$ and may be expressed as $|N_1|$. Comparing $|N_1|$ of the drilling fluid with and without particulates may provide a measure of the ability of a drilling fluid to control fluid flow within a subterranean formation. Embodiments of the present invention provide for such a measurement and subsequent analysis.

Provided are the definitions and formulas of values measured and calculated herein. It should be understood that unless otherwise specified, calculations and/or comparisons are of $N_1$ values measured by the same rheological method.

Normal Stress Values Based on the Fluid and Additive(s) Used in the TS Plug Test

- $\Delta N_{1(P)}$—Plug Normal Stress Difference calculated by $|N_{1(TA)}|-|N_{1(TB)}|$, wherein each First Normal Stress Difference value is measured by the same method
- $N_{1(TB)}$—First Normal Stress Difference of a test base drilling fluid
- $N_{1(TA)}$—First Normal Stress Difference of a test base drilling fluid with a test particulate concentration, wherein the concentration of the particulate is the minimum concentration needed to plug a tapered slot as determined by the TS Plug Method Normal Stress Values for the Fluid and Additive(s) for Potential Implementation in a Wellbore

- $\Delta N_{1(F)}=|N_{1(A)}|-|N_{1(B)}|$, wherein each First Normal Stress Difference value is measured by the same method
- $N_{1(B)}$—First Normal Stress Difference of the base drilling fluid
- $N_{1(A)}$—First Normal Stress Difference of the base fluid with a concentration of particulates Comparison of Normal Stress Values

- $\Delta N_{1(F)} \geqq \Delta N_{1(P)}$ may provide for lost circulation control
- $\Delta N_{1(F)} < \Delta N_{1(P)}$ may provide for fluid flow The following testing procedures, equations, and comparison may be used to determine the optimal concentration of particulates in a drilling fluid for use in a subterranean formation to provide for adequate lost circulation control or other flow characteristics.

It should be noted that when "about" is provided at the beginning of a numerical list, "about" modifies each number of the numerical list.

Figure 4A:
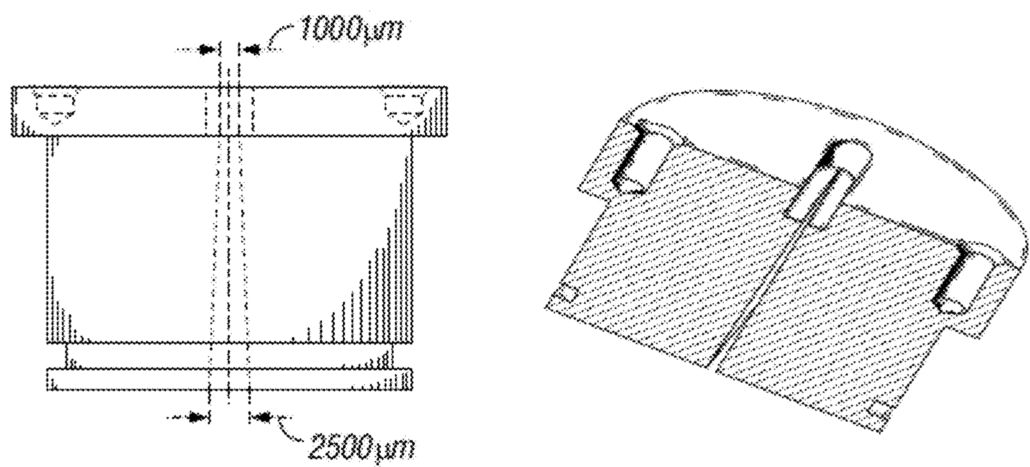
FIG. 4 is a schematic of the Tapered Slot apparatus used in the tests described herein.

The TS Plug Method, using a Particle Plugging Apparatus (FIG. 4B), may be used to test the performance of particulates in forming an impermeable plug or bridge in the filtering media and to arrest the fluid loss. A Particle Plugging Apparatus comprises a 500-mL volume cell that has a movable piston at the bottom and an assembly for sealing the filter media in while testing at the top. The fluid with particulates to be tested is loaded into the cell. The cell is positioned with pressure applied from the bottom of the cell and the filtrate collected from the top. This may help prevent other components of the drilling fluid that settle during the static test from contributing to the performance of the particulate. Pressure, applied by a two-stage hydraulic pump or using a nitrogen pressure line, is transferred to the drilling fluid through the floating piston in the cell. The filter media employed in the TS Plug Method is a tapered slot (FIG. 4A).

Figure 4B:
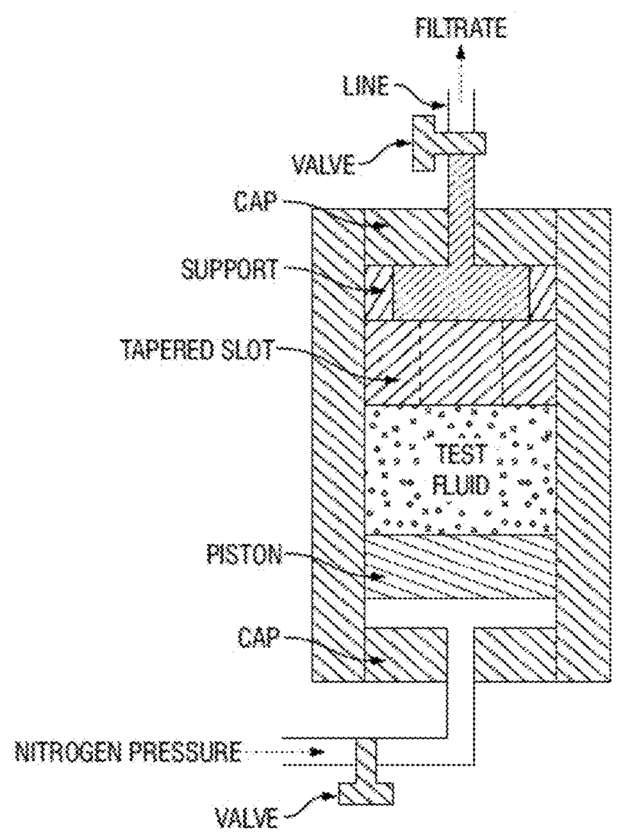

A variety of tapered slots may be used in the rheological methods of the present invention. A tapered slot consists of a machined metal with a slot that tapers from one end to another; it physically resembles a fracture. FIG. 4B provides a schematic and conceptual view of an example tapered slot where the slot tapers from 2.5 mm wide at the opening end to 1 mm wide at the closing end. In some embodiments, a tapered slot may taper from any opening width to any closing width over a certain length. As used herein, "slot" could be of any opening and/or closing shape including, but not limited to, circular, ovular, rectangular or square, slit with rounded ends, and irregular. One skilled in the art would understand that it may be necessary to choose a tapered slot to resemble a void of a subterranean formation for which fluid flow control, fluid loss control, and lost circulation control is desired. Suitable widths, for either the opening or closing end, may range from a lower limit of greater than about 0.1 mm, 0.5 mm, 1 mm, or 2 mm, to an upper limit of less than about 6 mm, 5 mm, 3 mm, 2 mm, or 1 mm, where the thickness may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

The Normal Stress Difference ($N_1$) may be measured by methods known to one skilled in the art. By way of nonlimiting example, the $N_1$ may be measured via rotational rheometry test using a MCR-301 Model Anton Paar Rheometer using PP-50 parallel plate geometry. The measurements may be conducted at 25° C. and atmospheric pressure with the gap between the plates set at 1 mm. About 2-3 mL of base drilling fluid may be placed in the gap which was then subjected to shear rate ramp from 0.1 $s^{-1}$ to 50 $s^{-1}$. Fifty data points (shear stress and $N_1$ values) may be collected at each selected shear rate. The test duration may take about one to three hours.

In some embodiments, $N_{1(TA)}$ may be determined by measuring the $N_1$ value of a composition comprising a minimum concentration of a test particulate in a test base drilling fluid needed to plug a tapered slot as determined by the TS Plug Method. The TS Plug Method, using a Particle Plugging Apparatus (FIG. 4B), may be used to test the performance of particulates in forming an impermeable plug or bridge in the filtering media and to arrest the fluid loss. A Particle Plugging Apparatus comprises a 500 mL volume cell that has a movable piston at the bottom and an assembly for sealing the filter media in while testing at the top. The fluid with particulates to be tested is loaded into the cell. The cell is positioned with pressure applied from the bottom of the cell and the filtrate collected from the top. This may help prevent other components of the drilling fluid that settle during the static test from contributing to the performance of the particulate. Pressure, applied by a two-stage hydraulic pump or using a nitrogen pressure line, is transferred to the drilling fluid through the floating piston in the cell. The filter media employed in the TS Plug Method is a tapered slot (FIG. 4A).

A tapered slot consists of a machined metal with a slot that tapers from one end to another which physically resembles a fracture. FIG. 4A provides a schematic and conceptual view where the slot tapers from 1 mm at the top to 2.5 mm at the bottom which is the tapered slot used in the examples provided.

The performance of the particulate is determined by the ability of the particulate to form an impermeable plug or bridge in the filtering media and to arrest the fluid loss.

In some embodiments, a minimum concentration of a test particulate in a test base drilling fluid may be determined by varying the concentration of the test particulate in the test base fluid to achieve the minimum concentration by which a tapered slot is plugged. It should be understood that "minimum concentration" and "threshold concentration" may be used interchangeably which as used herein, does not necessarily mean an absolute minimum to several significant digits, rather minimum concentration may be to a desired significant digit of one skilled in the art. One skilled in the art would understand the number of significant digits needed in determining a minimum concentration given the level of accuracy desired.

In some embodiments, a Plug Normal Stress Difference ($\Delta N_{1(P)}$) may be determined by measuring $N_{1(TB)}$ and $N_{1(TA)}$ for a test base fluid and a test particulate and calculating $\Delta N_{1(P)}=|N_{1(TA)}|-|N_{1(TB)}|$. In some embodiments, $N_{1(A)}$ and $N_{1(B)}$ may be measured for a test fluid and particulates and $\Delta N_{1(F)}=|N_{1(A)}|-|N_{1(B)}|$ calculated.

In some embodiments, $\Delta N_{1(F)}$ may be compared to $\Delta N_{1(P)}$. In some embodiments, $\Delta N_{1(F)} \geqq \Delta N_{1(P)}$ may provide lost circulation control by reducing fluid flow through voids.

In some embodiments when comparing $\Delta N_{1(F)}$ to $\Delta N_{1(P)}$, the base drilling fluid and the test base drilling fluid may be the same or different, including comparisons between an aqueous-based drilling fluid and an oil-based drilling fluid. In some embodiments when comparing $\Delta N_{1(F)}$ to $\Delta N_{1(P)}$, the particulate and the test particulate may be the same or different.

In some embodiments, $\Delta N_{1(F)}$ compared to $\Delta N_{1(P)}$ may be used to determine an optimal concentration of particulates in a base drilling fluid. In some embodiments, $\Delta N_{1(F)}$ compared to $\Delta N_{1(P)}$ may be used to determine a concentration of particulates in a base fluid to achieve a desired level of lost circulation control. In some embodiments, the concentration of particulates in a base drilling fluid may be adjusted to provide $\Delta N_{1(F)} \geqq \Delta N_{1(P)}$, thereby providing for lost circulation control.

Suitable locations for measuring an $N_1$ value may be anywhere the appropriate equipment is available including, but not limited to, in a lab, at a production facility, at a wellbore site, and any combination thereof.

As $\Delta N_{1(F)} \geqq \Delta N_{1(P)}$ may provide lost circulation control by reducing fluid flow through voids, $\Delta N_{1(F)} < \Delta N_{1(P)}$ may provide for at least some fluid flow through voids. In some embodiments, the concentration of particulates in a base fluid may be adjusted to provide $\Delta N_{1(F)} < \Delta N_{1(P)}$, thereby providing for fluid flow. Suitable methods where ensuring fluid flow may be desired includes, but is not limited to, fracturing and installing proppant packs.

A suitable base drilling fluid and/or a suitable test base drilling fluid may include an oil-based fluid, an aqueous-based fluid, a water-in-oil emulsion, or an oil-in-water emulsion. Suitable oil-based fluids may include an alkane, an olefin, an aromatic organic compound, a cyclic alkane, a paraffin, a diesel fluid, a mineral oil, a desulfurized hydrogenated kerosene, and any combination thereof. Suitable aqueous-based fluids may include fresh water, saltwater (e.g., water containing one or more salts dissolved therein), brine (e.g., saturated salt water), seawater, and any combination thereof. Examples of suitable invert emulsions include those disclosed in U.S. Pat. No. 5,905,061, U.S. Pat. No. 5,977,031, and U.S. Pat. No. 6,828,279, each of which are incorporated herein by reference.

Examples of lost circulation materials suitable for use in the present invention may be any known lost circulation material, bridging agent, fluid loss control agent, diverting agent, plugging agent, or the like suitable for use in a subterranean formation. A suitable lost circulation material may be natural or synthetic, degradable or nondegradable, particles or fibers, and mixtures thereof.

Suitable examples of materials for a lost circulation material include, but are not limited to, sand, shale, ground marble, bauxite, ceramic materials, glass materials, metal pellets, high strength synthetic fibers, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

In some embodiments, a lost circulation material may be degradable. Nonlimiting examples of suitable degradable materials that may be used in the present invention include, but are not limited to, degradable polymers (crosslinked or otherwise), dehydrated compounds, and/or mixtures of the two. In choosing the appropriate degradable material, one should consider the degradation products that will result. As for degradable polymers, a polymer is considered to be "degradable" herein if the degradation is due to, inter alia, chemical and/or radical process such as hydrolysis, oxidation, enzymatic degradation, or UV radiation. Suitable examples of degradable polymers for a lost circulation material for use in the present invention that may be used include, but are not limited to, those described in the publication of Advances in Polymer Science, Vol. 157 entitled "Degradable Aliphatic Polyesters" edited by A. C. Albertsson. Polymers may be homopolymers, random, linear, crosslinked, block, graft, and star- and hyper-branched. Such suitable polymers may be prepared by polycondensation reactions, ring-opening polymerizations, free radical polymerizations, anionic polymerizations, carbocationic polymerizations, and coordinative ring-opening polymerization, and any other suitable process. Specific examples of suitable polymers include polysaccharides such as dextran or cellulose; chitin; chitosan; proteins; orthoesters; aliphatic polyesters; poly(lactide); poly (glycolide); poly(ε-caprolactone); poly(hydroxybutyrate); poly(anhydrides); aliphatic polycarbonates; poly(orthoesters); poly(amino acids); poly(ethylene oxide); and polyphosphazenes. Of these suitable polymers, aliphatic polyesters and polyanhydrides are preferred. Dehydrated compounds may be used in accordance with the present invention as a degradable solid particulate. A dehydrated compound is suitable for use in the present invention if it will degrade over time as it is rehydrated. For example, particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. Certain degradable materials may also be suitable as compositions of a solid degradable particulate for use in the present invention. One example of a suitable blend of materials is a mixture of poly(lactic acid) and sodium borate where the mixing of an acid and base could result in a neutral solution where this is desirable. Another example would include a blend of poly(lactic acid) and boric oxide, a blend of calcium carbonate and poly(lactic)acid, a blend of magnesium oxide and poly(lactic)acid, and the like. In certain preferred embodiments, the degradable material is calcium carbonate plus poly(lactic)acid. Where a mixture including poly(lactic)acid is used, in certain preferred embodiments the poly(lactic)acid is present in the mixture in a stoichiometric amount, e.g., where a mixture of calcium carbonate and poly(lactic)acid is used, the mixture comprises two poly(lactic)acid units for each calcium carbonate unit. Other blends that undergo an irreversible degradation may also be suitable, if the products of the degradation do not undesirably interfere with either the conductivity of the filter cake or with the production of any of the fluids from the subterranean formation.

In some embodiments, a combination of lost circulation materials may be used. In some embodiments, a combination of lost circulation materials with a high aspect ratio and a low aspect ratio may be used. One skilled in the art can determine which of the lost circulation materials included herein qualify as high aspect ratio and/or low aspect ratio. As used herein, high aspect ratio are aspect ratios greater than about 2, and low aspect ratios are aspect ratios less than about 2. One skilled in the art will understand that some lost circulation materials provided herein may be available in different shapes and/or sizes which would determine the aspect ratio. Suitable high aspect ratio lost circulation materials may include, but not be limited to, fibers of cellulose including viscose cellulosic fibers, oil coated cellulosic fibers, and fibers derived from a plant product like paper fibers; carbon including carbon fibers; melt-processed inorganic fibers including basalt fibers, woolastonite fibers, non-amorphous metallic fibers, ceramic fibers, and glass fibers; polymeric fibers including polypropylene fibers and poly(acrylic nitrile) fibers; and any combination thereof.

In certain embodiments, the present invention is directed to the optimal adjustment of a concentration of particulates based on $N_1$ measurements and comparisons. In some embodiments, a preferred concentration of particulates in a base drilling fluid may range from a lower limit of greater than about 0.01 pounds per barrel ("PPB"), 0.05 PPB, 0.1 PPB, 0.5 PPB, 1 PPB, 3 PPB, 5 PPB, 10 PPB, 25 PPB, or 50 PPB to an upper limit of less than about 150 PPB, 100 PPB, 75 PPB, 50 PPB, 25 PPB, 10 PPB, 5 PPB, 4 PPB, 3 PPB, 2 PPB, 1 PPB, or 0.5 PPB in the base fluid, where the amount may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

The methods and compositions of the present invention may be suitable for use in subterranean formations.

The methods and compositions of the present invention may be used in many different types of subterranean treatment operations. Such operations include, but are not limited to, drilling operations, lost circulation operations, filter cake operations, stimulation operations, sand control operations, completion operations, acidizing operations, scale inhibiting operations, water-blocking operations, clay stabilizer operations, biocide operations, fracturing operations, frac-packing operations, gravel packing operations, wellbore strengthening, and sag control. The methods and compositions of the present invention may be used in full-scale operations or pills. As used herein, a "pill" is a type of relatively small volume of specially prepared treatment fluid placed or circulated in the wellbore.

Depending on the use of the treatment fluid, in some embodiments, other additives may optionally be included in a base fluid for use in the present invention. Examples of such additives may include, but are not limited to, salts; weighting agents; inert solids; fluid loss control agents; emulsifiers; dispersion aids; corrosion inhibitors; emulsion thinners; emulsion thickeners; viscosifying agents; high-pressure, high-temperature emulsifier-filtration control agents; surfactants; particulates; proppants; lost circulation materials; pH control additives; foaming agents; breakers; biocides; crosslinkers; stabilizers; chelating agents; scale inhibitors; gas; mutual solvents; oxidizers; reducers; and any combination thereof. A person of ordinary skill in the art, with the benefit of this disclosure, will recognize when an additive should be included in a base treatment fluid, as well as an appropriate amount of said additive to include.

In some embodiments the base fluid may include a polar organic molecule. Polar organic molecules suitable for use in the present invention may include any polar organic molecule including protic and aprotic organic molecules. Suitable protic compounds may include organic molecules with at least one functional group to include an alcohol, an acid, an amine, an amide, and any combination thereof. Suitable aprotic compounds may include organic molecules with at least one functional group to include an ester, an ether, a nitrile, a ketone, a sulfoxide, and any combination thereof. Suitable polar organic molecules may include an organic molecule with multiple functional groups including mixtures of protic and aprotic groups. In some embodiments, a base fluid may comprise multiple polar organic molecules. In some embodiments, a polar organic molecule may be present in a base fluid in an amount from a lower limit of greater than about 0.01%, 0.1%, 0.5%, 1%, 5%, or 10% to an upper limit of less than about 100%, 90%, 75%, 50%, 25%, 20%, 15%, 10%, 5%, 1%, 0.5%, or 0.1% by volume of the base fluid, where the amount may range from any lower limit to any upper limit and encompass any subset between the upper and lower limits. Some of the lower limits listed above are greater than some of the listed upper limits, one skilled in the art will recognize that the selected subset will require the selection of an upper limit in excess of the selected lower limit.

In some embodiments the concentration of particulates may be adjusted to provide for fluid flow control, fluid loss control, and lost circulation control. Where lost circulation control may be provided or desired, suitable particulates may include a lost circulation material or the like. Where fluid flow may be provided or desired, a suitable particulate may be a proppant. In some embodiments, the particulate may include a lost circulation material, a proppant, or a combination thereof.

Proppants suitable for use in the present invention may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. Moreover, fibrous materials, that may or may not be used to bear the pressure of a closed fracture, may be included in certain embodiments of the present invention.

To facilitate a better understanding of the present invention, the following examples of preferred embodiments are given. In no way should the following examples be read to limit, or to define, the scope of the invention.

EXAMPLES

Measuring First Normal Stress Difference

Figure 2:
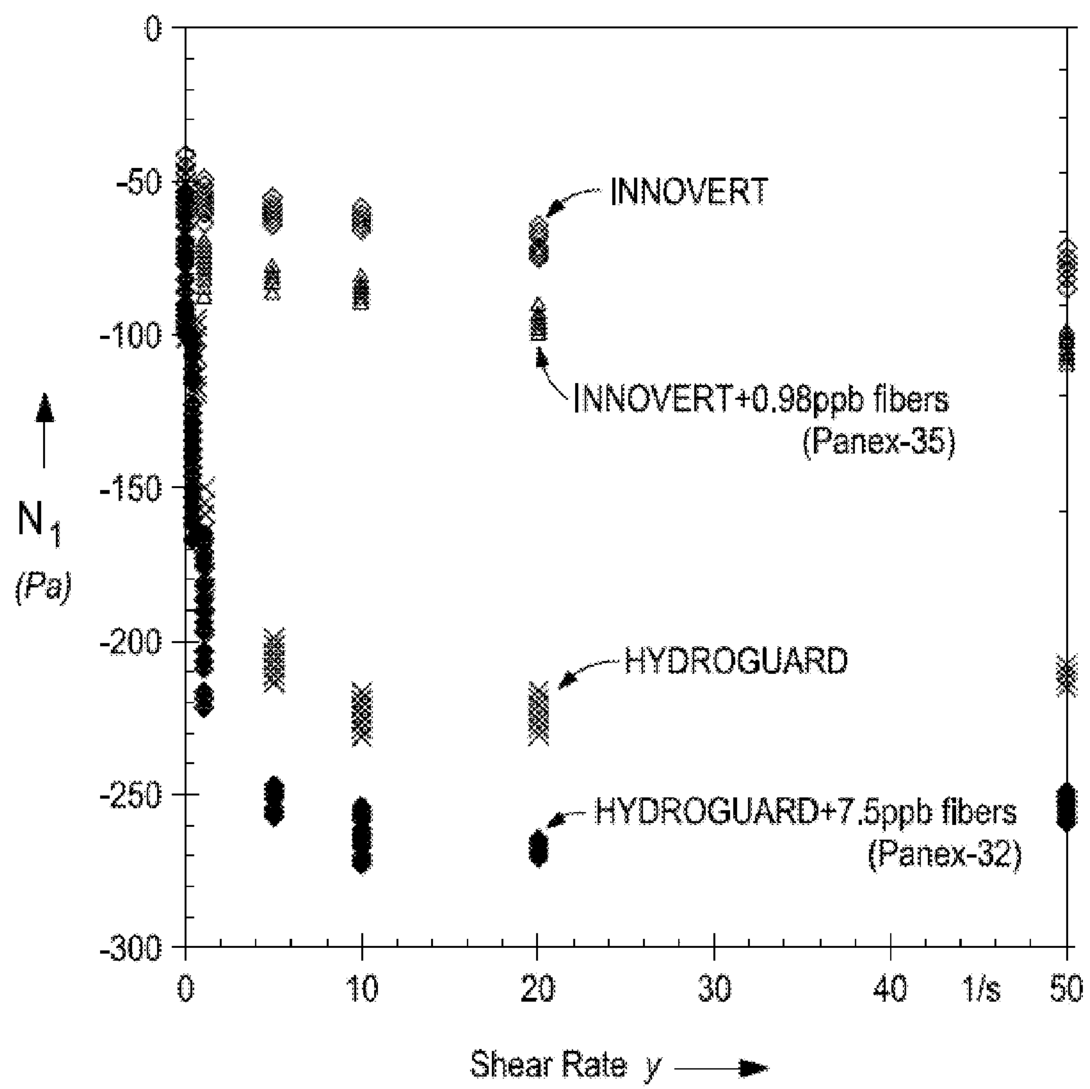
FIG. 2 is a comparison of First Normal Stress Difference for two drilling fluids with and without a fiber particulate of length 150 microns.
Figure 3:
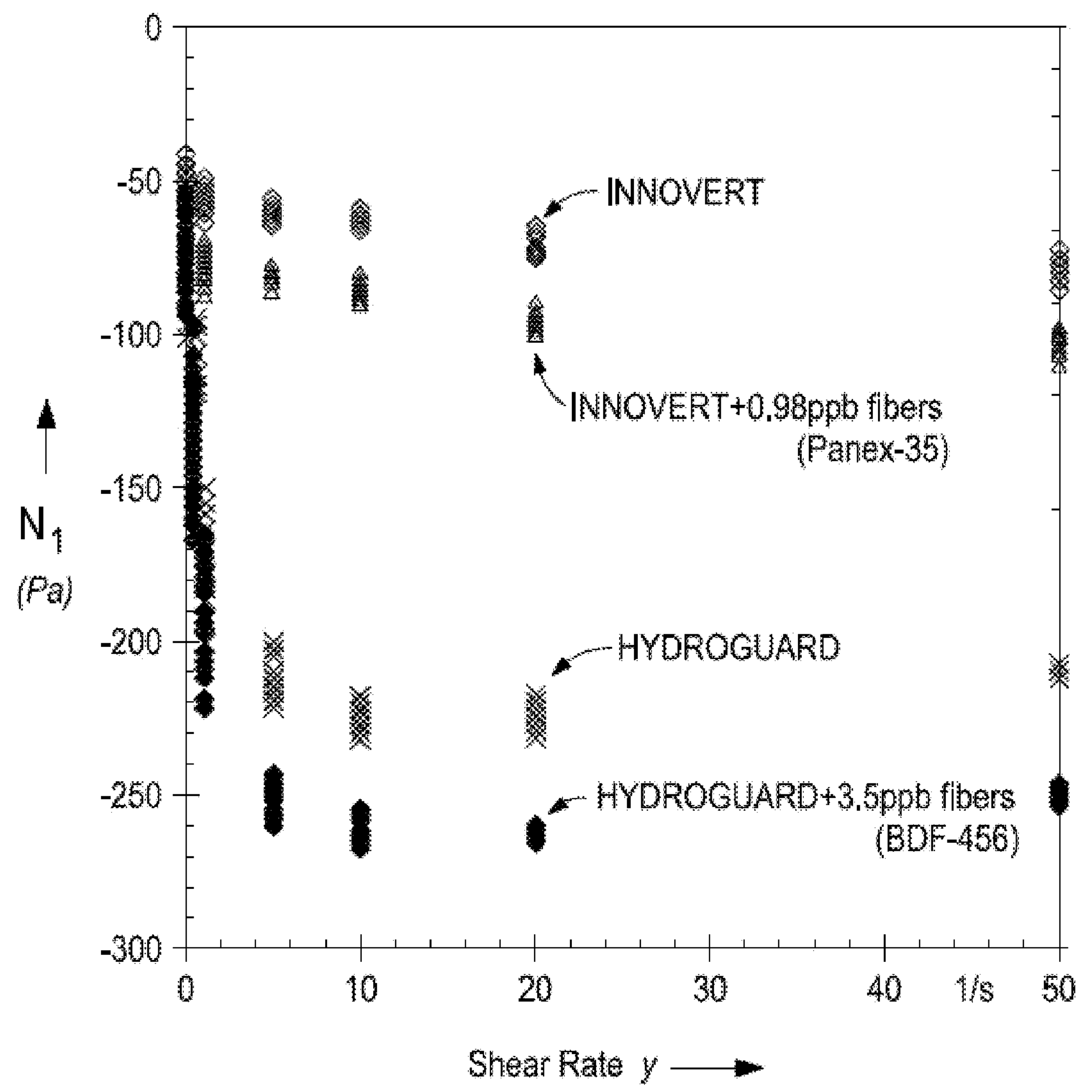
FIG. 3 is a comparison of First Normal Stress Difference for two drilling fluids with and without a fiber particulate of length 2000 microns.

The first normal stress difference ($N_1$) was measured via rotational rheometry test using a MCR-301 Model Anton Paar Rheometer using PP-50 parallel plate geometry. The measurements were conducted at 25° C. and atmospheric pressure with the gap between the plates set at 1 mm. About 2-3 mL of base drilling fluid was placed in the gap which was then subjected to shear rate ramp from 0.1 $s^{-1}$ to 50 $s^{-1}$. Fifty data points (shear stress and $N_1$ values) were collected at each selected shear rate. The test duration was about one to three hours. FIGS. 1-3 shows the normal stress difference ($N_1$) vs. shear rate for different base drilling fluids with varied concentrations of lost circulation fibers.

TS Plug Method.

The TS Plug Method, using a Particle Plugging Apparatus (FIG. 4B), may be used to test the performance of particulates in forming an impermeable plug or bridge in the filtering media and to arrest the fluid loss. A Particle Plugging Apparatus comprises a 500 mL volume cell that has a movable piston at the bottom and an assembly for sealing the filter media in while testing at the top. The fluid with particulates to be tested is loaded into the cell. The cell is positioned with pressure applied from the bottom of the cell and the filtrate collected from the top. This may help prevent other components of the drilling fluid that settle during the static test from contributing to the performance of the particulate. Pressure, applied by a two-stage hydraulic pump or using a nitrogen pressure line, is transferred to the drilling fluid through the floating piston in the cell. The filter media employed in the TS Plug Method is a tapered slot (FIG. 4A).

A tapered slot consists of a machined metal with a slot that tapers from one end to another which physically resembles a fracture. FIG. 4A provides a schematic and conceptual view where the slot tapers from 1 mm at the top to 2.5 mm at the bottom which is the tapered slot used in the examples provided.

The performance of the particulate is determined by the ability of the particulate to form an impermeable plug or bridge in the filtering media and to arrest the fluid loss.

Example 1

The TS Plug Method was performed with the test base fluid of HYDROGAURD® (an aqueous-based drilling fluid, available from Halliburton Energy Services, Inc. in Houston, Tex.) and lost circulation materials (test particulates) of PANEX®-35 (a tow weave carbon fiber, available from Zoltek Corporation in St. Louis, Mo.), ground marble with d(50)=1200 μm, and resilient graphite carbon with d(50)=1000 μm were added to a drilling fluid sample at a concentration of 0.49 PPB, 50 PPB, and 8 PPB, respectively. A concentration of 0.49 pounds per barrel (PPB) provided a minimum concentration to plug the tapered slot with dimensions as shown in FIG. 4A. Additionally, HYDROGAURD® was tested with particulates of PANEX-32® (a tow weave carbon fiber, available from Zoltek Corporation in St. Louis, Mo.) and BDF®-456 (fiber, available from Halliburton Energy Services, Inc. in Duncan, Okla.) with ground marble and resilient graphite. A concentration of 7.5 PPB of PANEX-32® and 3.5 PPB of BDF®-456 provided a minimum concentration to plug the tapered slot with corresponding rheological data shown in FIGS. 2 and 3, respectively.

Example 2

Using HYDROGAURD® and PANEX-35, $N_{1(TB)}$ and $N_{1(TA)}$ were measured with the specs provided above and $\Delta N_{1(P)}=|N_{1(TA)}|-|N_{1(TB)}|$ calculated to be 20 Pa at a shear rate of greater than 5 $s^{-1}$. A second base fluid of INNOVERT® (an oil-based drilling fluid with an oil-base of mineral oil and alkanes, available from Halliburton Energy Services, Inc. in Houston, Tex.) with the same PANEX-35 particulate was tested. The concentration of PANEX°-35 in INNOVERT® was adjusted so that $\Delta N_{1(F)}=|N_{1(A)}|-|N_{1(B)}|=20$ Pa, wherein each First Normal Stress Difference values were also measured by the same method provided above. The concentration of PANEX-35 in INNOVERT® required to achieve $\Delta N_{1(F)}=$ 20 Pa was 0.98 PPB. FIG. 1 shows the First Normal Stress Difference plots for HYDROGAURD®, HYDROGAURD® with 0.49 PPB PANEX®-35, INNOVERT®, and INNOVERT® with 0.98 PPB PANEX®-35. When this formulation was run through the tapered slot, plugging was observed within 20 mL of fluid passage. By comparison, INNOVERT® with 0.49 PPB of PANEX®-35 provided no plugging, which when measured for this formulation, $\Delta N_{1(F)}=$ 5 Pa.

Example 3

A variety of mixed lost circulation material compositions were tested with the TS Plug Method to examine the particulate effects of high aspect ratio particulates with low aspect ratio particulates. The base fluids tested were an aqueous-based fluid and an oil based fluid with the following compositions.

| Aqueous-Based Drilling Fluid | | Oil-Based Drilling Fluid | |
|---|---|---|---|
| Product | Conc (PPB) | Product | Conc (PPB) |
| barite | as required | barite | as required |
| sodium chloride | as required | base oil for 65:35 oil to water ratio | as required |
| primary viscosifier | 1 | water + $CaCl_2$ (250,000 ppm) | as required |
| sodium hydroxide | 0.25 | emulsifier | 8 |
| fluid loss additive | 0.15 | lime | 1.5 |
| shale stabilizer-1 | 0.5 | fluid loss additive | 1.5 |
| shale stabilizer-2 | 2 | viscosifier | 3 |
| shale stabilizer-3 | 5 | suspension agent | 5 |
| fluid loss additive/viscosifier | 5 | calcium carbonate 5 | 30 |
| | | low end rheology modifier | 3 |
| | | drill solids | 20 |

Figure 5:
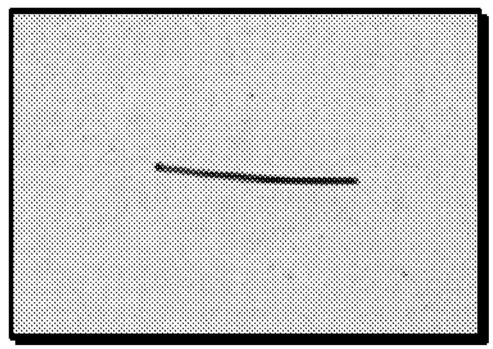
FIG. 5 is optical micrographs of four fibers used as lost circulation materials.
Figure 5:
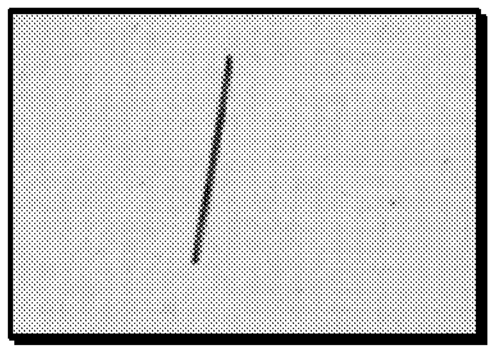
Figure 5:
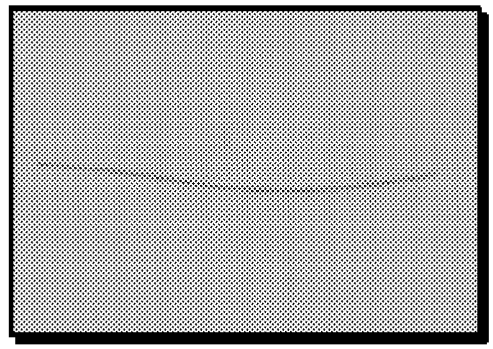
Figure 5:
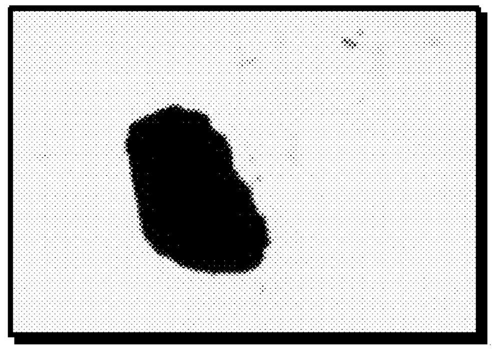

The particulates tested included ground marble (GM), resilient graphitic carbon (RGC), carbon fibers (CF), viscose cellulosic fibers, and oil coated cellulosic fibers (OCF). The ground marble and resilient graphitic carbon were tested in varying sizes. Properties of the fibers are as follows with optical micrographs of each in FIG. 5.

| Fiber Tested | Fiber Length (μm) | Aspect Ratio |
|---|---|---|
| viscose cellulosic fibers - 1 (VCF1) | 1570 | ~28 |
| viscose cellulosic fibers - 2 (VCF2) | 1900 | ~35 |
| oil coated cellulosic fiber | 180 | 1.8 |
| carbon fiber | 3000 | 50 |

The particulates were tested in the particle plugging apparatus and mud loss was measured for a variety of combinations as follows.

| Fluid Base | Particulates | Relative Ratio of Particulates | Concentration in Fluid (PPB) | Mud Loss (mL) |
|---|---|---|---|---|
| aqueous | GM1200/RGC400 | 80/20 | 50/8.2 | 70 |
| aqueous | GM1200/RGC1000 | 80/20 | 50/8.2 | 90 |
| aqueous | GM600/RGC1000 | 80/20 | 50/8.2 | 80 |
| aqueous | GM1200/VCF1 | 95/5 | 60/1.8 | no control |
| aqueous | GM1200/VCF2 | 95/5 | 60/1.8 | no control |
| aqueous | GM600/VCF1 | 95/5 | 60/1.8 | no control |
| aqueous | GM1200/RGC400/VCF1 | 70/20/10 | 44/8.2/3.5 | 10 |
| aqueous | GM1200/RGC400/VCF2 | 70/20/10 | 44/8.2/3.5 | 10 |
| aqueous | GM1200/RGC1000/VCF1 | 70/20/10 | 44/8.2/3.5 | 25 |
| aqueous | GM1200/RGC1000/VCF2 | 70/20/10 | 44/8.2/3.5 | 40 |
| aqueous | GM1200/RGC400/CF | 79/20/1 | 49/8.2/0.5 | 15 |
| aqueous | GM1200/RGC1000/CF | 79/20/1 | 49/8.2/0.5 | 25 |
| aqueous | GM600/RGC1000/OCF | 65/20/15 | 41/8.2/4 | 25 |
| aqueous | GM1200/RGC1000/OCF | 65/20/15 | 41/8.2/4 | 40 |
| aqueous | GM1200/RGC400/OCF | 65/20/15 | 41/8.2/4 | 10 |
| oil | GM1200/RCG1000 | 80/20 | | no control |
| oil | GM600/RCG1000 | 80/20 | | no control |
| oil | GM1200/RCG1000/CF | 79/20/1 | | no control |
| oil | GM1200/RCG400/CF | 79/20/1 | | 35 |
| oil | GM600/RCG1000/CF | 79/20/1 | | no control |
| oil | GM1200/RCG1000/VCF1 | 75/20/5 | | no control |
| oil | GM1200/RCG400/VCF1 | 75/20/5 | | no control |

Example 4

Figure 6:
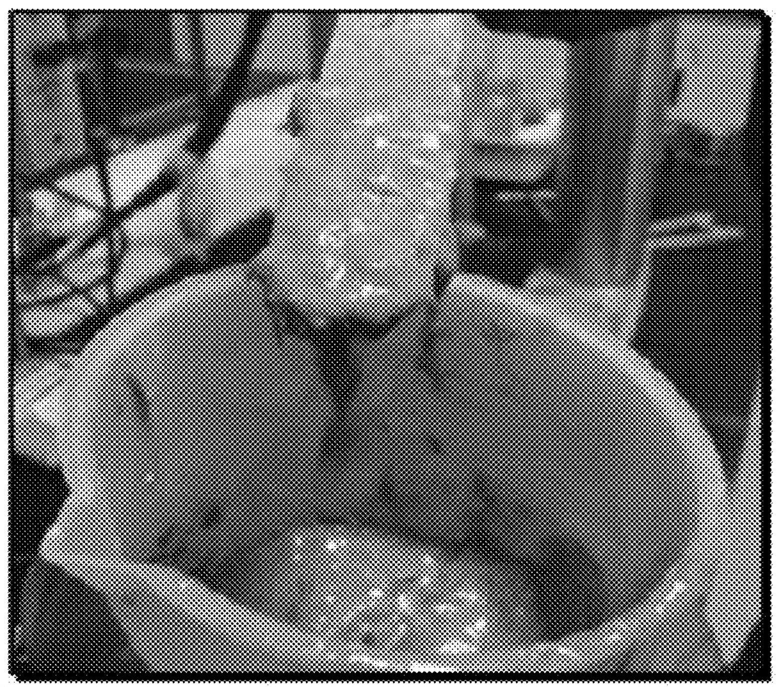
FIG. 6 is photographs of aqueous-based drilling fluids with varied fiber concentrations.

FIG. 6 illustrates how the addition of fibers to a drilling fluid physically change the viscosity of a drilling fluid. FIG. 6 are photographs taken of the aqueous-based drilling fluid of Example 3 with the addition of carbon fibers at 0.5 PPB (top) and 2.5 PBB (bottom). At high concentrations of fibers, the fluid may become unpumpable. In addition, observation of the physical change in viscosity was noted for other fiber-laden fluids. For example, aqueous-based drilling fluids with 15% v/v of a carbon fiber 150 μm in length had no significant visible change in viscosity, while only 5% v/v of a carbon fiber 3 mm in length resulted in a very thick mud.

Therefore, the present invention is well-adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patents or other documents that may be incorporated herein by reference, the definitions that are consistent with this specification should be adopted.

What is claimed is:

1. A method comprising:

providing a test drilling fluid comprising a test base fluid and a plurality of test particulates, wherein a first normal stress difference of the test drilling fluid without the plurality of test particulates is characterized by having a normal stress of $N_{1(TB)}$ as calculated in a rheological procedure that includes a known rheometer model, testing temperature, testing pressure, testing shear ramp rate, and testing gap setting; and adjusting the concentration of the plurality of test particulates in the test drilling fluid to achieve a minimum concentration of the test particulate in the test drilling fluid that will substantially plug a tapered slot, testing the test drilling fluid with the minimum concentration of the test particulate with the rheological procedure to determine a normal stress of $N_{1(TA)}$; and, calculating $\Delta N_{1(p)}=|N_{1(A)}|-|N_{1(B)}|$;

providing a drilling fluid comprising a base fluid and a plurality of particulates, wherein a first normal stress difference of the drilling fluid without the plurality of particulates is characterized by having a normal stress of $N_{1(B)}$) as calculated in a rheological procedure that includes a known rheometer model, testing temperature, testing pressure, testing shear ramp rate, and testing gap setting; and testing the drilling fluid with a concentration of the particulates with the rheological procedure to determine a normal stress of $N_{1(A)}$; and, calculating $\Delta N_{1(F)}=|N_{1(A)}|-|N_{1(B)}|$;

adjusting the concentration of the plurality of particulates in the drilling fluid by comparing the value of a first normal stress difference of the drilling fluid ($\Delta N_{1(F)}$) to the plug normal stress difference of a test base drilling fluid ($\Delta N_{1(p)}$ so that $\Delta N_{1(F)} \geqq \Delta N_{1(p)}$.

2. The method of claim 1, wherein the drilling fluid comprises a fluid selected from the group consisting of an oil-based drilling fluid, an aqueous-based drilling fluid, a water-in-oil emulsion, and an oil-in-water emulsion.

3. The method of claim 1, wherein the drilling fluid further comprises an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a high-pressure, high-temperature emulsifier-filtration control agent; a surfactant; a particulate; a proppant; a lost circulation material; a pH control additive; a foaming agent; a breaker; a biocide; a crosslinker; a stabilizer; a chelating agent; a scale inhibitor; a gas; a mutual solvent; an oxidizer; a reducer; and any combination thereof.

4. The method of claim 1, wherein the drilling fluid comprises an oil-based fluid and a polar organic molecule.

5. The method of claim 1 further comprising:

allowing the particulates to be placed in a void in the subterranean formation and/or the wellbore thereby reducing the flow of the drilling fluid or a subsequent fluid into at least a portion of the subterranean formation neighboring the void.

6. The method of claim 1, wherein the particulates comprise a lost circulation material.

7. The method of claim 6, wherein the lost circulation material comprises a fiber.

8. The method of claim 5, wherein the void is selected from the group consisting of pores, vugs, fissures, cracks, fractures, and any combination thereof.

* * * * *